United States Patent

Siedlik et al.

[11] Patent Number: 5,910,029
[45] Date of Patent: Jun. 8, 1999

[54] TWO-PIECE BATTERY TERMINAL SHIELD

[75] Inventors: Henry Anthony Siedlik, Novi; Zenon Hotra, Troy; Michael Jerome Gniewek, Livonia, all of Mich.

[73] Assignee: UT Automotive Dearborn, Inc., Dearborn, Mich.

[21] Appl. No.: 08/796,469

[22] Filed: Feb. 10, 1997

[51] Int. Cl.$^6$ .................................................. H01R 13/46
[52] U.S. Cl. ........................................ 439/522; 174/138 F
[58] Field of Search ................................. 439/522, 521, 439/202, 147, 892, 519; 16/260, 266, 267; 174/138 F

[56] References Cited

U.S. PATENT DOCUMENTS

| | | | |
|---|---|---|---|
| 1,558,223 | 6/1925 | Law et al. | |
| 3,633,154 | 1/1972 | Glantz. | |
| 4,698,459 | 10/1987 | Drake | 439/522 |
| 5,311,643 | 5/1994 | Marquardt et al. | 16/267 |
| 5,346,407 | 9/1994 | Hood | 439/522 |
| 5,399,103 | 3/1995 | Kuboshima et al. | 439/509 |
| 5,439,759 | 8/1995 | Lippert et al. | 429/65 |
| 5,576,516 | 11/1996 | Kameyama et al. | 174/138 F |

*Primary Examiner*—Neil Abrams
*Assistant Examiner*—Eugene G. Byrd
*Attorney, Agent, or Firm*—Howard & Howard

[57] ABSTRACT

A two-piece battery terminal shield generally comprises a base having a first hinge member hingedly interlocked with a second hinge member which is integral with a cover. The base further includes a first connector, such as a latch window, for removable connection to a second connector, on the cover. The second connector generally comprises a peninsular leg portion formed by two slits in a peripheral wall of the cover and a latch at a lower end of the leg portion. A release beam formed integrally with the leg portion extends outwardly and laterally from the leg portion. Portions of the release beam are spaced away from portions of the peripheral wall adjacent the leg portion, such that upon inward deformation of the leg portion, the release beam abuts the peripheral wall, thereby impeding excessive inward deformation of the leg portion. Upon further inward deformation of the leg portion and peripheral wall, the leg portion and peripheral wall abut stops formed in the base, thereby preventing damage to the leg portion and latch.

23 Claims, 4 Drawing Sheets

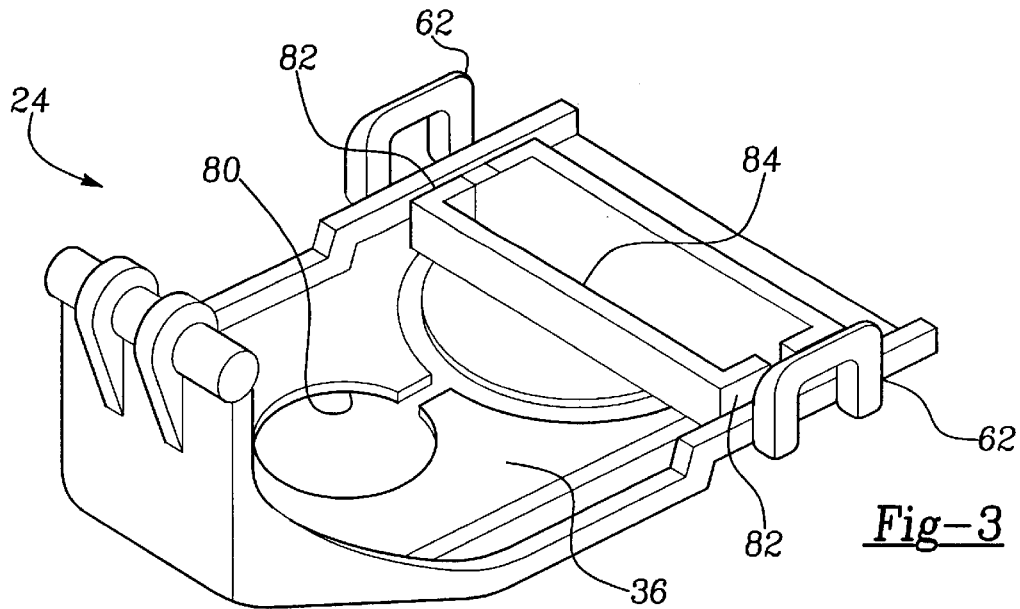
Fig-3
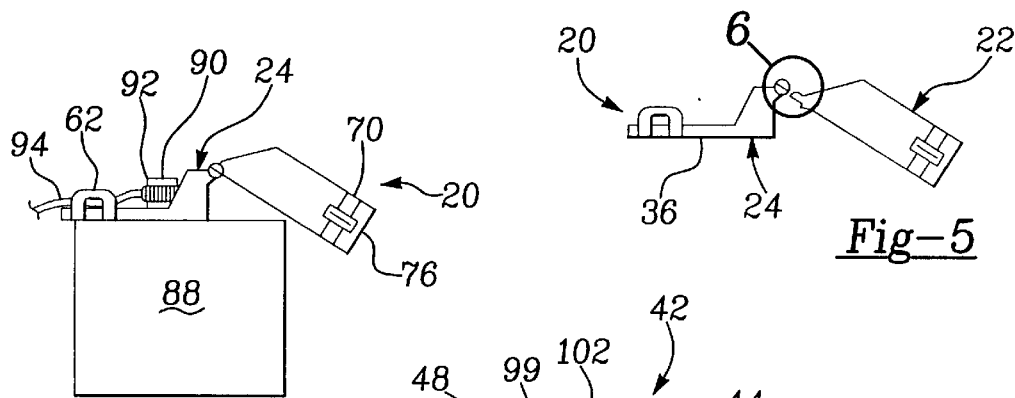
Fig-4
Fig-5
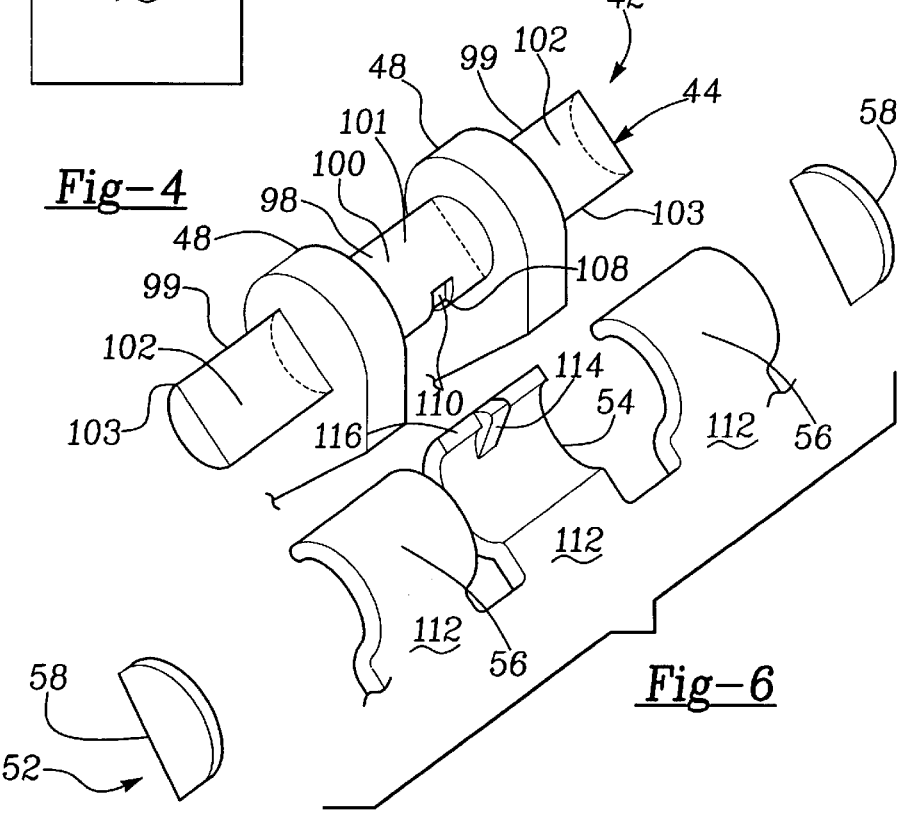
Fig-6

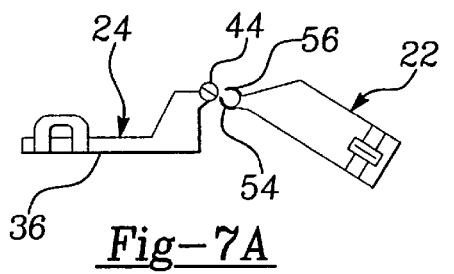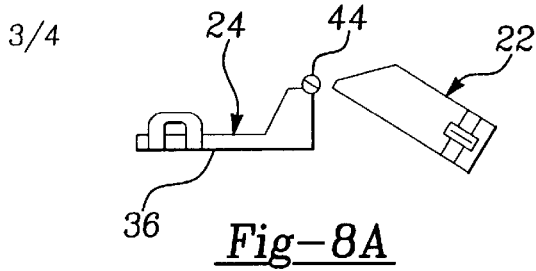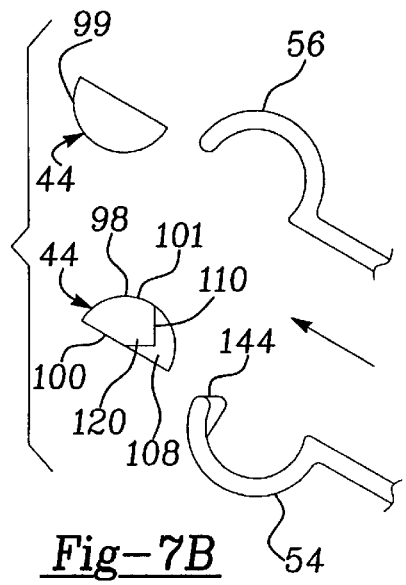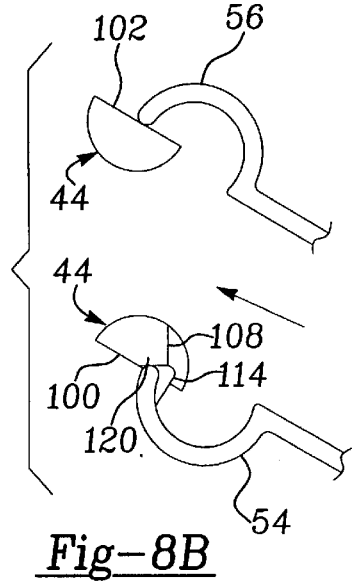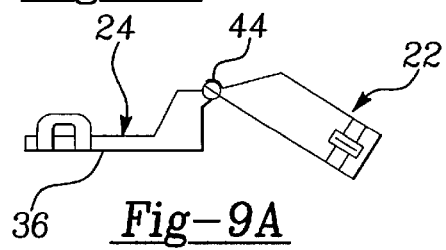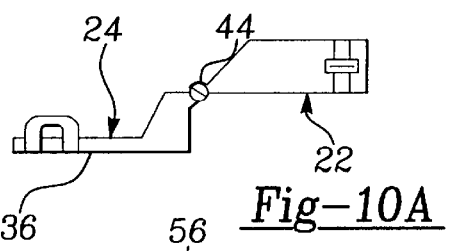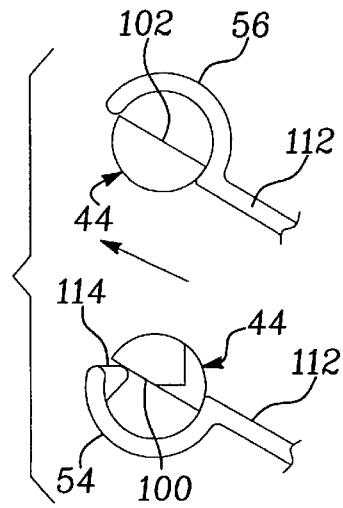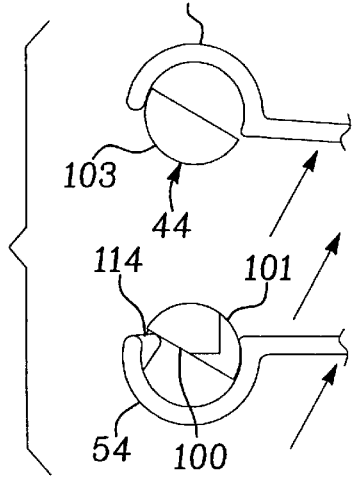

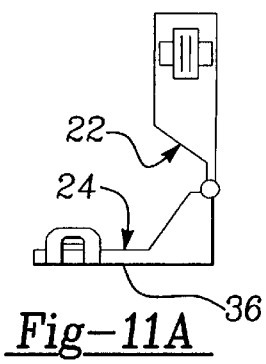
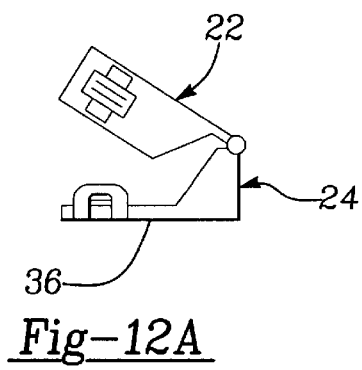
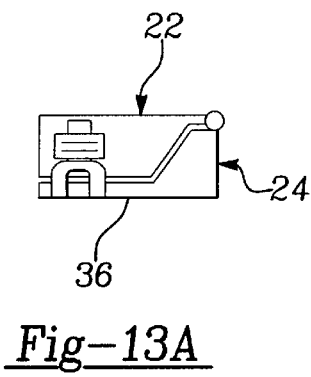
Fig-11A    Fig-12A    Fig-13A
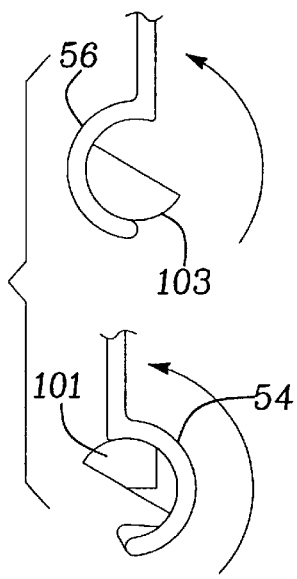
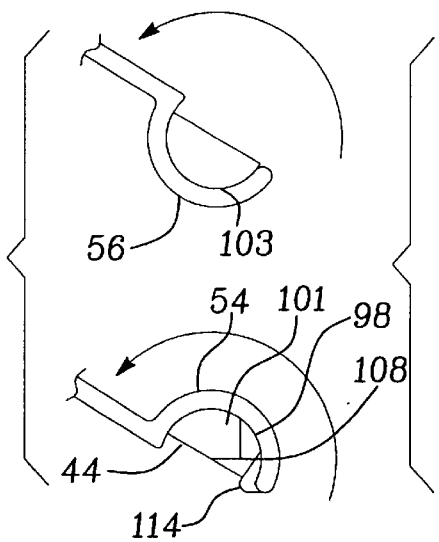
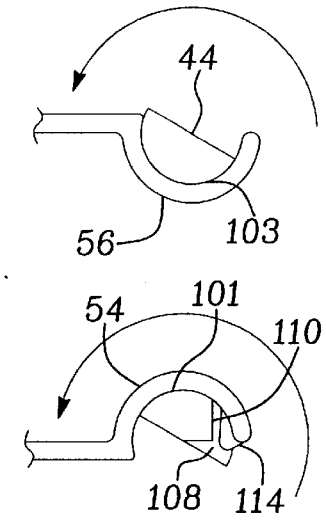
Fig-11B    Fig-12B    Fig-13B
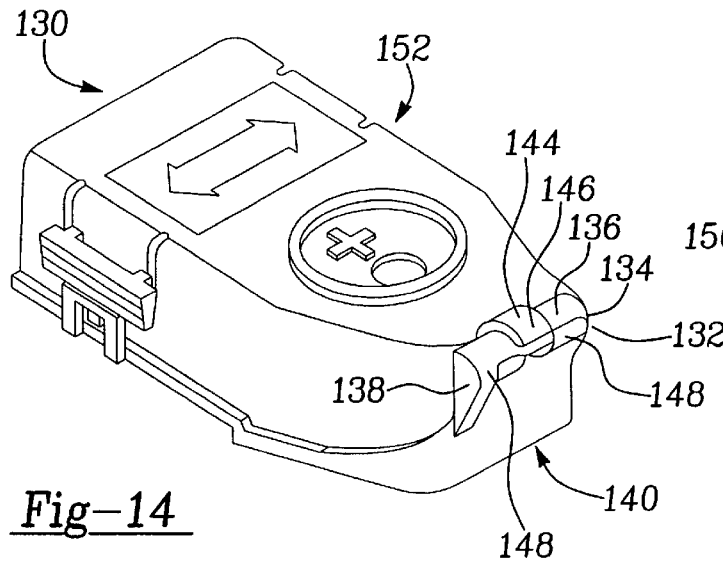
Fig-14
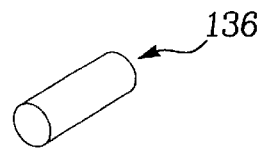
Fig-14A
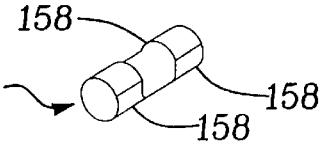
Fig-14B
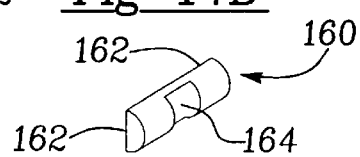
Fig-14C

TWO-PIECE BATTERY TERMINAL SHIELD

BACKGROUND OF THE INVENTION

This invention relates to a two-piece battery terminal shield having an improved hinge and latch. Batteries on many current vehicles are provided with battery terminal shields which enclose the battery terminals and battery cable connectors. The battery shields protect the battery terminals and connections from corrosion and also prevent inadvertent contact with the terminals by a person working on the vehicle.

Current battery terminal shields comprise a generally planar base portion having a orifice for receiving the battery terminal. A cover generally comprises a generally planar upper wall and a peripheral wall extending downwardly from the periphery of the upper wall. The cover and base are molded together as a single piece and connected by a living hinge. A pair of latch windows extend upwardly from either side of the base portion. The peripheral wall of the cover includes a pair of latches which snap into the latch windows on the base. The peripheral wall of the cover is deformable inwardly to selectively release the latches from the latch windows to open the cover of the battery terminal shield.

Current designs of the battery terminal shields have several drawbacks. First, during manufacture, the living hinge must be opened and closed several times immediately after the molding of the base and cover in order to develop the living hinge. This additional step increases the manufacturing time and cost. Second, the living hinge becomes brittle in cold temperatures. This problem is exacerbated by the fact that access to battery terminals is more often required during cold weather. Further, cracking of the peripheral wall can occur when the peripheral wall is excessively deformed inwardly, particularly in cold temperatures. Further, it is difficult to grip and deform inwardly the peripheral wall to open the cover and access the battery terminals when wearing gloves, a particular drawback since access to the battery terminal cover is frequently required in cold weather.

SUMMARY OF THE INVENTION

The present invention provides a two-piece battery terminal shield which is simple and inexpensive to manufacture and has improved cold weather performance.

The battery terminal shield of the present invention generally comprises a base including a generally planar lower wall having an orifice for receiving a battery terminal. A pair of first connectors, such as latch windows, extend upwardly from the lower wall. The base further includes an integral first hinge member, such as a hinge pin.

A cover generally comprises a generally planar upper wall and a peripheral wall extending downwardly from the periphery of the upper wall. The cover further includes a set of second connectors, such as a pair of latches, extending downwardly. The cover includes an integral second hinge member, such as a plurality of hinge knuckles.

The base is hingably connected to the cover by snapping the hinge pin into the hinge knuckles. The hinge pin can be provided with several flattened portions which, when aligned with the hinge knuckles, facilitate with the insertion of the hinge pin into the hinge knuckles.

Preferably, the second connector on the cover comprises a leg portion in the peripheral wall which is partially separated from the peripheral wall by two slits. The leg portion is integral at an upper end with the peripheral wall and upper wall and includes a latch at a lower end. Preferably a release beam integral with the leg portion extends outwardly from the leg portion such that outer portions of the release beam are spaced outwardly from portions of the peripheral wall adjacent the leg portion, such that inward deformation of the leg portion is limited by the release beam contacting the peripheral wall. In order to further limit excessive inward deformation of the leg portion and peripheral wall, the base preferably includes an integral stop extending upwardly from the lower wall and spaced inwardly of the first connector, such that inward deformation of the leg portion and peripheral wall beyond releasing the latch from the latch window causes the leg portion and peripheral wall to contact the stop, thereby preventing excessive inward deformation. The battery terminal shield of the present invention is molded as two pieces, each of which can be molded without inserts or side cams.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 3 is a perspective view of the base of FIG. 1;

FIG. 4 is a side view of the battery terminal shield of FIG. 1 in an open position installed on a battery;

FIG. 5 is the battery terminal shield of FIG. 1 in a disassembled condition;

FIG. 6 is an enlarged perspective view of the area 6 of FIG. 5;

FIG. 7A is a disassembled side view of the battery terminal shield of FIG. 1 in a first assembly step;

FIG. 7B is an enlarged view of the hinge members of FIG. 7A;

FIG. 8A is the battery terminal shield of FIG. 7A in a second assembly step;

FIG. 8B is an enlarged view of the hinge members of FIG. 8A;

FIG. 9A is the battery terminal shield of FIG. 7A in a third assembly step;

FIG. 9B is an enlarged view of the hinge members of 9A;

FIG. 10A is the battery terminal shield of FIG. 7A in a fourth assembly step;

FIG. 10B is an enlarged view of the hinge members of FIG. 10A;

FIG. 11A is the battery terminal shield of FIG. 7A in a fifth assembly step;

FIG. 11B is an enlarged view of the hinge members of FIG. 11A;

FIG. 12A is the battery terminal shield of FIG. 7A in a sixth assembly step;

FIG. 12B is an enlarged view of the hinge members of FIG. 12A;

FIG. 13A is the battery terminal shield of FIG. 7A in a seventh assembly step;

FIG. 13B is an enlarged view of the hinge members of FIG. 13A;

FIG. 14 is a perspective of an alternate hinge connection between the cover and base;

FIG. 14A is an isolated view of the hinge pin of FIG. 14;

FIG. 14B is an alternate hinge pin for the hinge connection of FIG. 14; and

FIG. 14C is another alternate hinge pin for the hinge connection of FIG. 14.

DETAILED DESCRIPTION OF A PREFERRED EMBODIMENT

Figure 1:
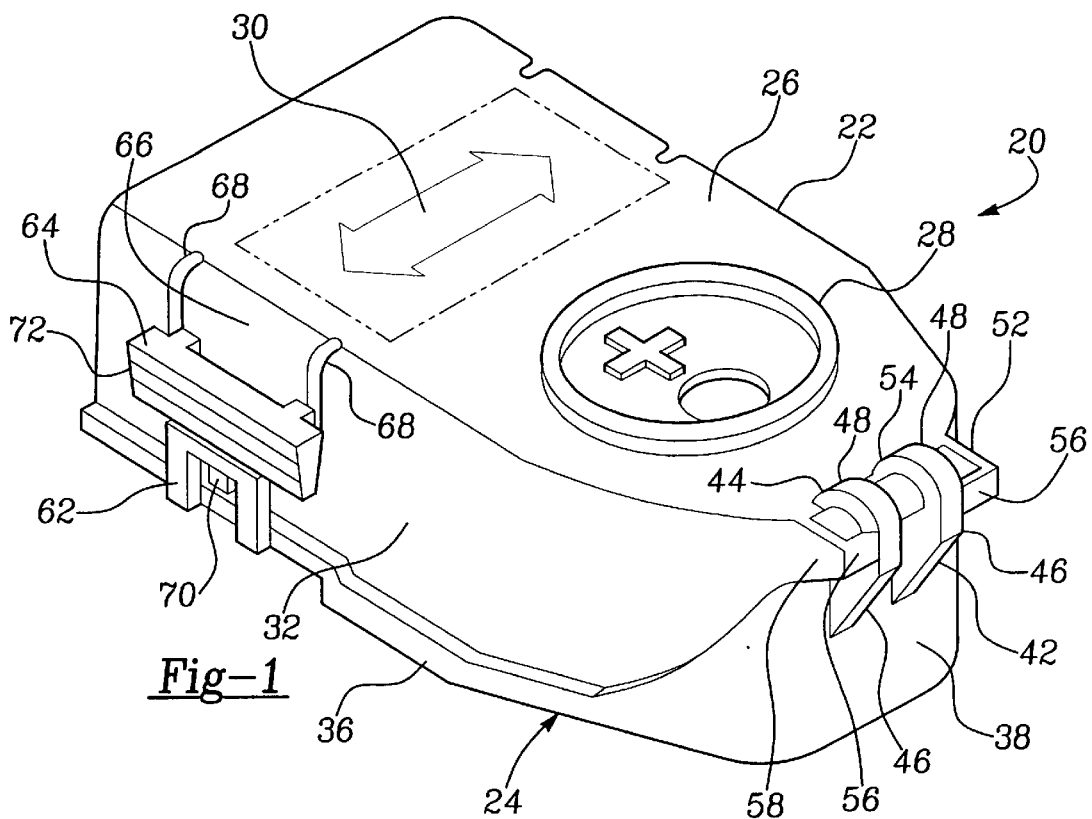
FIG. 1 is a perspective view of the battery terminal shield of the present invention.

A battery terminal shield 20 according to the present invention is generally shown in FIG. 1 comprising a cover 22 and a base 24. The cover 22 comprises a generally planar upper wall 26 having molded indicia 28 of polarity and instructive indicia 30 for opening the shield 20. A peripheral wall 32 extends downwardly generally from either lateral side of the upper wall 26.

The base 24 generally comprises a generally planar lower wall 36 having a rear wall 38 extending upwardly from a rear portion of the lower wall 36. The rear wall 38 of the base 24 supports an integral first hinge member 42. The first hinge member 42 preferably comprises a hinge pin 44 supported by brackets 46. A pair of axially spaced guides 48 protrude radially from the hinge pin 44. The hinge pin 44, brackets 46 and guides 48 are all molded integrally with the base 24. Alternate hinge members are described in co-pending application U.S. Ser. No. 08/796,468, filed on Feb. 10, 1997.

The cover 22 further includes an integral second hinge member 52. The second hinge member 52 preferably comprises a center upper hinge knuckle 54 opening downwardly and a pair of outer knuckles 56 opening upwardly on either side of the center knuckle 54. A pair of end caps 58 (one shown) are integrally molded on the outer ends of the outer knuckles 56. The center knuckle 54, outer knuckles 56 and end caps 58 are integrally molded with the cover 22.

The base 24 includes a pair of first connectors, preferably latch windows 62 (one shown), extending upwardly from the lower wall 36. The cover 22 includes a pair of second complementary connectors 64 (one shown) extending downwardly from the upper wall 26 for connection to the latch window 62. The second connector 64 preferably comprises a peninsular leg portion 66 formed in the peripheral wall 32 by a pair of slits 68. A latch 70 is formed on the lower end of the leg portion 66. A release beam 72 is formed integrally with the leg portion 66. The release beam 72 extends outwardly and then laterally from the leg portion 66 such that portions of the release beam 72 are adjacent but spaced away from portions of the peripheral wall 32 adjacent the leg portion 66.

Figure 2:
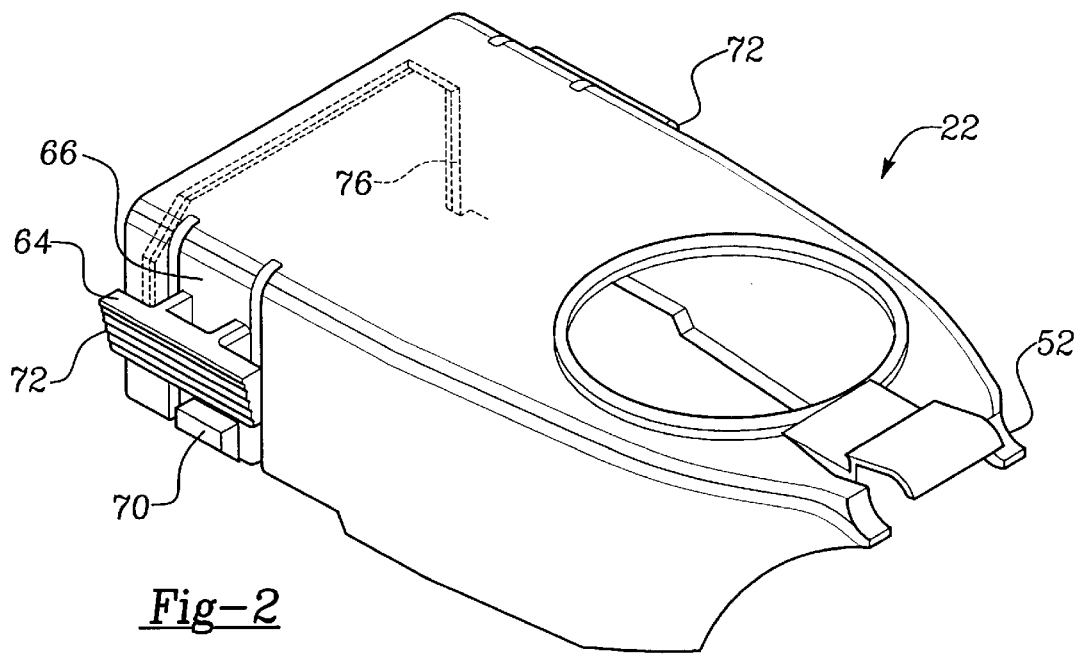
FIG. 2 is a perspective view of the cover of FIG. 1.

As can be seen in FIG. 2, the cover 22 includes a second connector 64 on either lateral side of the cover 22. Each release beam 72 extends outwardly and laterally from the leg portion 66, such that outer portions of each release beam 72 are spaced outwardly from the portions of the peripheral wall 32 adjacent the leg portion 66. To release the second connectors 64, the release beams 72 are squeezed together, thereby inwardly deforming leg portions 66 and releasing the latches 70. After sufficient deformation of the leg portions 66 to release the latches 70, the release beams 72 will eventually contact the portions of the peripheral wall 32 adjacent the leg portions 66 thereby impeding further deformation of the leg portions 66. The distance between the release beams 72 and the peripheral wall 72 is selected to insure that the latches 70 will be fully released by the time the release beams 72 contact the peripheral wall 72 but that the leg portion 66 will not be damaged. The large outer surface area provided by release beams 72 facilitates operation by a gloved hand. As can be seen in FIG. 2, the cover 22 further includes a front opening 76 opposite the hinge member 52 through which battery cables can pass. The cover 22 is preferably polypropylene and can be molded without inserts or side cams.

As can be seen in FIG. 3, the base 24 includes an orifice 80 for receiving a battery terminal. The base 24 further includes a pair of stops 82 extending upwardly from the lower wall 36 and spaced inwardly from each latch window 62. A lateral wall 84 extending upwardly from the lower wall 36 and integral with the stops 82 reinforces the stops 82. The distance between the stops 82 and the latch windows 62 is selected to permit inward deformation in FIG. 1 of the latches 70 on the cover 22 to release the latches 70, but that the latches 70 will contact the stop 82 in FIG. 3 before damage to the leg portion 66 due to excessive deformation. The base 24 is preferably polypropylene and can be molded without inserts or side cams.

As can be seen in FIG. 4, the battery terminal shield 20 is installed on a battery 88 by inserting a battery terminal 90 through the orifice 80 in the base 24. A terminal connector 92 of a battery cable 94 is subsequently connected to the battery terminal 90. The battery terminal shield 20 is then closed by pivoting the cover 22 and snapping the latches 70 into the latch windows 62, leaving battery cable 94 extending through the front opening 76 in the cover 22.

In FIG. 5, the cover 22 is shown detached from base 24 with the cover 22 being pivoted approximately 225° relative to the lower wall 36 of the base 24 relative to the cover's 22 closed position.

FIG. 6 is an enlarge perspective view of the hinge members 42, 52 of FIG. 5, with the same degree of rotation shown in FIG. 5. The hinge pin 44 is generally cylindrical and formed integrally with the brackets 46 and guides 48. The hinge pin 44 is generally segmented by the guides 48 into a center portion 98 between the guides 48 and outer portions 99 outward of guides 48. The center portion 98 is generally a half cylinder, having a center flat surface 100 opposite a half cylindrical surface 101. The outer portions 99 each include outer flat surfaces 102 opposite half cylindrical surfaces 103. The center flat surface 100 is generally on a lower side of hinge pin 44 forming an acute angle relative to the lower wall 36. The outer flat surfaces 102 are generally parallel to the center flat surface 100, but diametrically opposite the center flat surface 100. Preferably the center flat surface 100 and outer flat surface 102 pass substantially through the axis of the hinge pin 44, thereby substantially forming half cylindrical portions of the hinge pin 44. The center portion 98 of the hinge pin 44 includes a notch 108 in both the center half cylindrical surface 101 and the center flat surface 100. The notch 108 forms a vertical flat surface 110 in the half cylindrical surface 101 which is substantially perpendicular to the lower wall 36.

As can be seen in FIG. 6, the outer knuckles 56 of the second hinge member 52 open opposite the center knuckle 54. The knuckles 54, 56 are all supported by a bracket 112. End caps 58 (exploded for clarity) are formed integrally on the outer ends of the outer knuckles 56, thereby reducing the flexibility of the outer knuckles 56. The center knuckle 54 includes a tooth 114 protruding generally inwardly and forwardly from the center of a leading edge 116 of the center knuckle 54. The tooth 114 in the center knuckle 54 is generally aligned with the notch 108 in the center portion 98 of the hinge pin 44.

FIGS. 7A–13B illustrate the method for assembling the cover 22 to the base 24. As shown in FIG. 7A, the cover 22 is first positioned at approximately 225° relative to the lower wall 36 of the base 24. As can be seen in FIG. 7B, the outer knuckles 56 are aligned with the outer portions 99 of the hinge pin 44 and the center knuckle 54 is aligned with the center portion 98 of the hinge pin 44, aligning the tooth 114 in the center knuckle 54 with the notch 108 in the hinge pin 44. The notch 108 includes the vertical flat surface 110 formed in the center half cylindrical surface 101 which is generally perpendicular to lower wall 36. The notch 108 further includes a horizontal flat surface 120 in the center flat surface 100 which is generally parallel to lower wall 36.

The cover 22 is then slid towards the hinge pin 44 as shown in FIG. 8A. As can be seen in FIG. 8B, the outer knuckles 56 slide along outer flat surface 102 while the tooth 114 on the center knuckle 54 first abuts the horizontal flat surface 120 of the notch 108.

In FIG. 9A, the cover 22 is fully slid onto hinge pin 44. As can be seen in FIG. 9B, the tooth 114 of the center knuckle 54 rides the horizontal flat surface 120 of the notch 108 thereby deforming the center knuckle 54 outwardly onto center flat portion 100. As can be seen in FIG. 9B, when the cover 22 is fully slid onto the hinge pin 44 in this orientation, the bracket 112 supporting the knuckles 54, 56 abuts the hinge pin 44. In this position, the tooth 114 is still located on center flat portion 100 and the center knuckle 54 is therefore still deformed outwardly.

As can be seen in FIG. 10A, the center knuckle 54 and tooth 114 then bias the cover 22 to the 180° position relative to the lower wall 36 of the base 24. In this position, as can be seen in FIG. 10B, the outer knuckles 56 begin to abut the outer half cylindrical surfaces 103 of the hinge pin 44 and the center knuckle 54 beings to abut the center half cylindrical surface 101. In this position, the knuckles 54, 56 are interlocked with the hinge pin 44, providing a hinged connection. The center knuckle 54 is no longer deformed outwardly.

Rotation of the cover 22 to the 90° position relative to the lower wall 36 of the base 24 is shown in FIG. 11A. As can be seen in FIG. 11B, the center knuckle 54 continues to rotate about the center half cylindrical surface 101 and the outer knuckles 56 continue to rotate about the outer half cylindrical surface 103.

In FIG. 12A, the cover 22 is rotated roughly to a 30° position relative to the lower wall 36 of the base 24. As can be seen in FIG. 12B, in this position, the outer knuckles 56 fully abut the outer half cylindrical surfaces 103 and the center knuckle 54 fully abuts the center half cylindrical surface 101. Further, the tooth 114 in the center knuckle 54 enters the notch 108 in the center portion 98 of the hinge pin 44.

In FIG. 13A, the cover is rotated to the closed or zero degree rotation position relative to the lower wall 36 of the base 24. As can be seen in FIG. 13B, in this position, the outer knuckles 56 abut the outer half cylindrical surfaces 103 of the hinge pin 44. The center knuckle 54 abuts the center half cylindrical surface 101 of the hinge pin 44 and the tooth 114 of the center knuckle 54 is disposed within the notch 108 abutting the vertical flat portion 110, such that the center knuckle 54 is not deformed outwardly.

As shown above, the hinge members 42, 52 are slidably engaged and thereafter interlocked to provide a hinged connection between the cover 22 and the base 24. Thereafter, the cover 22 will be retained hingably to the base 24 but will not be inadvertently removed from the base 24. Upon re-opening the cover 22, generally to a position shown in FIGS. 10A and 10B, the tooth 114 of the center knuckle 54 will abut the center flat surface 100 of the hinge pin 44 impeding sufficient rotation to release the cover 22. However the cover 22 may be removed by forcibly rotating it to the position shown in FIG. 9A, wherein the center knuckle 54 is deformed outwardly sufficiently to permit outer knuckles 56 to slid outwardly along outer flat surfaces 102.

After assembly, the battery terminal shield 20 of the present invention is installed on a battery 88 as shown in FIG. 4. The battery terminal 90 is inserted through the orifice 80 in the lower wall 36 of the base 24. The battery cable 94 is then connected to the battery terminal 90 with a terminal connector 92. The cover 22 is then hingably rotated on base 24 to a closed position, in which the latches 70 of the covers 22 engage the latch window 62 of the base 24. During operation of the vehicle, the battery terminal shield 20 substantially encloses the battery terminal 90 and terminal connector 92, preventing corrosion and inadvertent contact. Should access to the battery terminal 90 be required, the battery terminal shield can be opened by squeezing the release beams 72 inwardly, such as between the thumb and forefinger. After sufficient inward deformation of the leg portions 66 to release latches 70, the release beams 72 abut the peripheral wall 32 adjacent the leg portions 66, thereby impeding inward excessive deformation. If sufficient inward force is presented to deform peripheral wall 32, the leg portions 66 and adjacent portions of the peripheral wall 32 will abut stops 82 in the base 24, thereby preventing excessive inward deformation of the leg portions 66. Upon release of the latches 70 from the latch window 62, the battery terminal shield is opened, hinging at the first hinge member 42 and second hinge member 52. The hinge connection formed by the first hinge member integral with the base 24 and the second hinge member 52 integral with the cover 22 is not deformed during operation and is therefore durable after numerous operations even in cold temperatures.

An alternate battery terminal shield 130 is shown in FIG. 14 having an alternate hinged connection 132 wherein the first hinge member 134 is a generally cylindrical hinge pin 136 supported by brackets 138, all integral with the base 140. The brackets 138 are integral with the ends of the hinge pin 136, but could alternatively include the guides 48 discussed above. The second hinge member 144 comprises a center knuckle 146 opening downwardly and a pair of outer knuckles 148 on either side of center knuckle 146 opening upwardly. The center knuckle 146 and outer knuckles 148 are integral with the cover 152.

An enlarged view of the hinge pin 136 is shown in FIG. 14A. The hinge pin 136 is generally cylindrical. In order to interlock with knuckles 146, 148, the knuckles 146, 148 are deformed outwardly as hinge pin 136 snaps into knuckles 146, 148.

Alternatively, the hinge pin 156 could be as shown in FIG. 14B. The hinge pin 156 is generally cylindrical, but includes flat portions 158. In cross section, the flat portions 158 form chords, preferably not passing through the axis of the hinge pin 156. The flat portions 158 in the hinge pin 156 of FIG. 14B are generally parallel to each other. During assembly of the cover 152 to the base 140, the cover 152 is rotated to align the knuckles 146, 148 with the flat portions 158. The outer deformation of the knuckles 146, 148 is reduced utilizing the hinge pin 156 of FIG. 14B.

An alternate hinge pin 160 is shown in FIG. 14C. The hinge pin 160 is generally cylindrical but includes outer flat portions 162 and a center flat portion 164. In cross section, the flat portions 162, 164 are preferably chords not passing through the axis of the hinge pin 160. However, the outer flat portions 162 are not parallel to the center flat portion 164, but rather, are tapered away from the center flat portion 164. As a result, upon assembly, the knuckles 54, 56 gradually deform outwardly as they ride up ramps formed by the flat portions 162, 164, before snapping over the hinge pin 160.

Each of the hinge pins 136, 156, 160 in FIGS. 14A–C are preferably formed integrally with the base 24. However, it should be recognized that the hinge pins 136, 156, 160 and knuckles 146, 148 could be switched between the cover 152 and base 140.

The battery terminal shield 20 of the present invention provides improved durability and cold temperature performance. Variations to the preferred embodiment which are within the scope of the present invention should be apparent. For example, many of the components, such as the hinge members 42, 52, the connectors 62, 64, the peripheral wall 32 could be located on either the cover 22 or the base 24. Further, the latch windows 62 could be located on the leg portions 66.

In accordance with the provisions of the patent statutes, the present invention has been described in what is considered to represent a preferred embodiment. However, it should be noted that the invention can be practiced otherwise than as specifically illustrated and described without departing from its spirit or scope.

What is claimed is:

1. A battery terminal shield comprising:
   a base including an orifice for receiving a battery terminal, said base including an integral first hinge member; and
   a cover including an upper wall and a peripheral wall extending downwardly from the periphery of said upper wall, said cover including an integral second hinge member interlocked with said first hinge member to form a hinged connection between said base and said cover.

2. The battery terminal shield of claim 1, wherein said base includes a first connector extending upwardly from a generally planar lower wall and said cover includes a second connector for connection to said first connector.

3. The battery terminal shield of claim 2 wherein said peripheral wall is deformable inwardly to release said second connector from said first connector.

4. The battery terminal shield of claim 3 further including a stop extending upwardly from said lower wall of said base and spaced inwardly from said peripheral wall, such that inward deformation of said peripheral wall causes said peripheral wall to contact said stop, thereby preventing excessive deformation.

5. The battery terminal shield of claim 3 wherein said peripheral wall includes a peninsular flexible leg portion including said second connector.

6. The battery terminal shield of claim 5 further including a release beam on an outer surface of said leg portion, said release beam extending outwardly and laterally from said leg portion such that a portion of said release beam is adjacent a portion of said peripheral wall other than at said leg portion, whereby inward deformation of said leg portion beyond a first position necessary to release said second connector causes said release beam to contact said peripheral wall other than at said leg portion.

7. The battery terminal shield of claim 1 wherein one of said cover and said base includes an integrated hinge pin and the other of said cover and said base includes at least one integrated knuckle, said hinge pin interlocked with said at least one knuckle to form a hinged connection between said cover and said base.

8. The battery terminal shield of claim 7 wherein said hinge pin is generally cylindrical and includes at least one flattened portion, said knuckle being slidable on said flattened portion to interlock said hinge pin and said knuckle.

9. The battery terminal shield of claim 7 wherein said at least one knuckle includes a first knuckle having an internal radius generally equal to an outer radius of said hinge pin, said first knuckle having a tooth extending inwardly, said tooth biasing said first knuckle outwardly during insertion of said hinge pin into said knuckle, said hinge pin including a portion of reduced diameter in which said tooth is disposed during pivoting of said cover relative to said base in a first range in which said first knuckle is not deformed outwardly.

10. The battery terminal shield of claim 7 further including:
    a first knuckle and a second knuckle;
    said first knuckle having an internal radius generally equal to an outer radius of said hinge pin, said first knuckle having a tooth extending inwardly;
    said hinge pin being generally cylindrical having an axis and first and second axially-space flattened portions on opposing sides of said axis;
    said first knuckle aligning with said first flattened portion and said second knuckle aligning with a second flattened portion while said hinge pin is inserted into said first and second knuckles.

11. The battery terminal shield of claim 10 wherein said first knuckle has a tooth extending inwardly;
    said tooth biasing said first knuckle outwardly during insertion of said hinge pin into said knuckle, said hinge pin including a portion of reduced diameter in which said tooth is disposed during pivoting of said cover relative to said base in a first range in which said first knuckle is not deformed outwardly.

12. The battery terminal shield of claim 10 wherein said first and second flattened portions are generally parallel.

13. The battery terminal shield of claim 10 wherein said first and second flattened portions generally form an acute angle, said first and second knuckles riding along said first and second flattened portions during insertion of said hinge pin into said knuckles, said first knuckle being deformed outwardly by said first flattened portion during said insertion.

14. The battery terminal shield of claim 7 further including:
    said at least one knuckle including a center knuckle and a pair of outer knuckles on either side of said center knuckle, said outer knuckles opening opposite said center knuckle;
    said hinge pin being generally cylindrical and having outer flattened portions on either side of a center flattened portion, said center knuckle aligning with said center flattened portion and said outer knuckles aligning with said outer flattened portion during insertion of said hinge pin into said knuckles.

15. The battery terminal shield of claim 1, wherein said base and said cover are each molded without inserts or side cams.

16. The battery terminal shield of claim 1, wherein said base includes a rear wall extending upwardly from a generally planar lower wall, said first hinge member being integrally formed on an upper end of said rear wall.

17. A battery terminal shield comprising:
    a base including an orifice for receiving a battery terminal, said base including a first connector extending upwardly from said base;

a cover including an upper wall and a peripheral wall extending downwardly from the periphery of said upper wall, said peripheral wall including a second connector for connection to said first connector; and one of said first connector and said second connector being inwardly deformable to release the connection between said first and second connectors, inward deformation of said deformable one beyond a position necessary to release said connectors being limited by an abutment surface.

18. The battery terminal shield of claim 17 wherein said deformable one of said first and second connectors includes a release beam on an outer surface of said deformable one, said release beam extending laterally from said deformable one such that a portion of said release beam is adjacent said abutment surface and inward deformation of said deformable one beyond a first position necessary to release said first and second connectors causes said release beam to contact said abutment surface, thereby impeding further inward deformation.

19. The battery terminal shield of claim 17 wherein one of said cover and said base includes a stop extending toward the other of said cover and said base, said stop spaced inwardly of said deformable one and including said abutment surface.

20. The battery terminal shield of claim 17 wherein said second connector is formed in said peripheral wall, said peripheral wall being deformable inwardly to release said second connector from said first connector.

21. The battery terminal shield of claim 20 wherein said peripheral wall includes a peninsular flexible leg portion including said second connector.

22. The battery terminal shield of claim 21 further including a release beam on an outer surface of said leg portion, said release beam extending laterally from said leg portion such that a portion of said release beam is adjacent a portion of said peripheral wall other than at said leg portion, whereby inward deformation of said leg portion beyond a first position necessary to release said second connector causes said release beam to contact said peripheral wall other than at said leg portion.

23. A battery terminal shield comprising:

a base including an orifice for receiving a battery terminal, said base including an integral first hinge member and a first connector extending upwardly from said base; and a cover including an upper wall and a peripheral wall extending downwardly from the periphery of said upper wall, said cover including an integral second hinge member interlocked with said first hinge member to form a hinged connection between said base and said cover, said cover including a second connector for connection to said first connector;

one of said first connector and said second connector being inwardly deformable to release the connection between said first and second connectors;

said deformable one of said first and second connectors including a release beam on an outer surface of said deformable one, said release beam extending laterally from said deformable one such that a portion of said release beam is adjacent said abutment surface and inward deformation of said deformable one beyond a first position necessary to release said first and second connectors causes said release beam to contact an abutment surface, thereby impeding further inward deformation.

* * * * *